United States Patent [19]
Weinheimer et al.

[11] Patent Number: 5,888,130
[45] Date of Patent: Mar. 30, 1999

[54] FOLDED CASING FOR PRODUCTS TO BE FILLED INDIVIDUALLY

[75] Inventors: Alois Weinheimer, Alzey; Gerald Seel, Taunusstein; Dieter Uhlmann, Wiesbaden, all of Germany

[73] Assignee: Kalle Nalo GmbH, Wiesbaden, Germany

[21] Appl. No.: 831,004

[22] Filed: Mar. 31, 1997

[30] Foreign Application Priority Data

Apr. 1, 1996 [DE] Germany .................. 196 13 069.7

[51] Int. Cl.[6] .................................................. A22C 11/00
[52] U.S. Cl. ............................ 452/30; 452/35; 452/48
[58] Field of Search ................. 452/30, 21, 22, 452/48, 35

[56] References Cited

U.S. PATENT DOCUMENTS

| | | | |
|---|---|---|---|
| 3,064,803 | 11/1962 | Erchin et al. | 452/48 |
| 4,162,693 | 7/1979 | Beckman | 452/21 |
| 5,045,020 | 9/1991 | Neeff et al. | 452/21 |
| 5,215,495 | 6/1993 | Crevasse | 452/21 |

FOREIGN PATENT DOCUMENTS

| | | | |
|---|---|---|---|
| 253195 | 1/1988 | European Pat. Off. | 452/48 |
| 932651 | 9/1955 | Germany | 452/48 |
| 23 18 457 | 10/1974 | Germany . | |
| 3012622 | 10/1981 | Germany | 452/30 |
| 89 14 412 | 4/1990 | Germany . | |
| 43 14 949 | 11/1993 | Germany . | |

*Primary Examiner*—Willis Little
*Attorney, Agent, or Firm*—Foley & Lardner

[57] ABSTRACT

A folded casing arrangement capable of being used for individually filled products is provided. The casing arrangement comprises: a casing having an extended length, the casing being arranged to have at least three portions: 1) a first end portion formed at one end of the casing which forms a stick configuration, the first end portion having a plurality of folds compressed into one another; 2) a middle portion; and 3) a second end portion including a folded portion that is folded transversely to the length of the casing. The folded portion is pleated in a longitudinal direction with respect to the casing, and the second end portion is provided with a tying means.

23 Claims, 3 Drawing Sheets

FOLDED CASING FOR PRODUCTS TO BE FILLED INDIVIDUALLY

BACKGROUND OF THE INVENTION

The present invention relates to a folded casing for products to be filled individually. In particular, the present invention relates to a casing, folded to form what is known as a "stick" or concertina, for packaging an individual product, wherein a front end of the casing is tied up.

DESCRIPTION OF RELATED ART

Folded, unpackaged sausage casings of small caliber having a diameter of less than about 85 mm are known and typically are used for containing many types of dry sausage. Conventional processes for filling such casings employ, for example, known filling machines. In typical processes, extended flat casings, which are, for example, from 100 to 180 cm long and tied up at one end, are soaked in water in order to render the casings supple. The soaked casings are slipped by hand over a filling spout (or stuffing horn) and folded. A typical folding operation requires an operator to continuously carry out repetitive creasing motions by hand, which is extra-ordinarily tiring. In addition, casings having lengths of more than 1.80 m tend to completely lose their form and shape as a result of the presoaking, so that it is no longer possible to slip a casing of such a length over the stuffing horn within the time available which is governed by the machine cycle. In fact, after presoaking casings having lengths greater than about 1.80 m, the casing will end up attaching itself by suction to the stuffing horn, so that it can no longer be folded manually.

DE-A 43 14 949 discloses a folded casing for individual products, which is compactly packaged, so that unshirring of the casing before filling is avoided. A casing, folded and compactly packaged as taught by DE-A 43 14 949 can be held in the hand of a filling machine operator and fitted to the stuffing horn without the casing having to be folded by hand. However, DE-A 43 14 949 teaches that the unfolded casing should have a length of from 1.02 to 1.52 m, and in any event, should not exceed about 1.78 m. In another known process, which is also mentioned in DE-A 43 14 949, is a process described in Section III of the publication "Sausage casing technology", edited by Indel Karmas, published by Noyes Data Corporation, New Jersey (1974). In the Karmas process, large lengths of casing are folded to give a concertina or stick. The folded sticks contain about 20 m of casing which is folded or compressed to a length of about 35 to 44 cm. The stick is packaged in a net which prevents unshirring of the stick and allows it to be subsequently soaked in water to obtain flexibility and extensibility of the casing while folded. After soaking, the packaging is removed and the stick is slipped over a stuffing horn. As compared with individual casings, the use of sticks requires a more complicated machine since the latter is required to double-clip and cut the casing, lay the casing in loops, as well as fill the casing with sausage meat. Since the stick has a far greater length of casing than usual, twenty to fifty sausages can be produced from one stick by using this type of machine.

In a process employing sticks, hand shirring or folding of the casing is not required. However, a disadvantage to using sticks is that, for example, the diameter of the stuffing horn must generally be smaller than the diameter of a stuffing horn used to produce individual casings. For example, if long folded casings are used to prepare a sausage having a diameter of 50 mm, a suitable stuffing horn will generally need to have a diameter of 28 mm or less; on the other hand, a larger diameter stuffing horn having a diameter of 36 mm can be used if individual casings are employed. For compressing very long casing material to a length which can be accommodated by a machine, a shirring mandrel having a diameter which is up to 50% smaller than the diameter of the sausage to be produced therefrom must generally be used.

Folded casings generally have small internal diameters. The problem of a small internal diameter of the folded casing is further intensified during the soaking of the sticks in water during preparation for filling the casing. During soaking, the stick swells, thereby causing a further narrowing of its clear width and necessitates an even smaller stuffing horn. The use of a longer stuffing horn with a smaller diameter results in, inter alia, a slower throughput performance, an increase in fat blobs and poorer particle definition.

Nowadays, it is generally the practice that casings should be composted to the extent possible after their use. Thus, it is generally desirable to be able to shirr casings of a length greater than 1.50 m without an additional net, since the material used for the net can generally only be very poorly composted, or even not composted at all.

SUMMARY OF THE INVENTION

It is one object of the present invention to provide a folded casing which can be used to prepare individual products of greater lengths. It is also an object to provide a casing capable of forming stick configuration having sufficient stability without specifically requiring a net or other compact packaging. It is still further an object to provide a casing that can be filled at a high throughput rate without the risk of a tied-up end of the casing bursting open.

In accordance with these and other objects, there is provided according to one aspect of the present invention a folded casing arrangement capable of being used for individually filled products. The casing arrangement comprises: a casing having an extended length, the casing being arranged to have at least three portions, 1) a first end portion formed at one end of said casing which forms a stick configuration, said first end portion having a plurality of folds compressed into one another;

2) a middle portion; and 3) a second end portion including a folded portion that is folded transversely to the length of the casing. The folded portion is pleated in a longitudinal direction with respect to the casing, and the second end portion is provided with a tying means.

In accordance with another aspect of the present invention, there is provided a method for producing a folded casing comprising: compressing a first end of the casing by imposing a series of folds therein so that the first end of said casing forms a stick configuration; transversely folding a length d of the opposite end of the casing with respect to the longitudinal direction of the folded casing along an axis m so that two section lengths of the casing having a length d are superposed to form a folded end; and folding the folded end in the longitudinal direction of the folded casing to pleat same. Preferably, the folded end is tied.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

The present objects of the invention are substantially achieved in such a way that the front end of the extended casing should be folded over transversely to the length of the casing in the middle of a predetermined section, and the folded-over section and an extended part of the casing are pleated and tied up. The tying then preferably bears against an edge of the folded-over pleated section.

In a preferred embodiment of the invention, two equal-sized pleated section lengths of the front end of a casing are superposed. Expediently, the section length is here at least 2 cm. In a further development of the present invention, the folds are preferably shaped in the form of a cup or shell, each fold being bent substantially inward and having a height of up to 20 mm, and the folds are preferably fitted into each other to form a stick configuration (also sometimes known as a concertina configuration). Expediently, the portion of 6 the casing adjoining the front end of the casing is preferably formed into the shape of a cup with a curved bottom which extends into the interior of the stick configuration.

The present invention achieves an advantage that a casing for an individual product having a relatively long length, for example, 1.50 to 3.50 m, has an internal diameter which is only slightly greater than the diameter of the stuffing horn to be used, so that rapid filling of the casing at a filling pressure of, for example, 0.6 to 0.8 bar is achieved, without the occurrence of fat blobs and also without tearing open the tied-up end of the casing. A further advantage of the present invention is that the stick configuration has sufficient stability and retains its size and shape, even after soaking for a minimum duration of 30 minutes.

Figure 1:
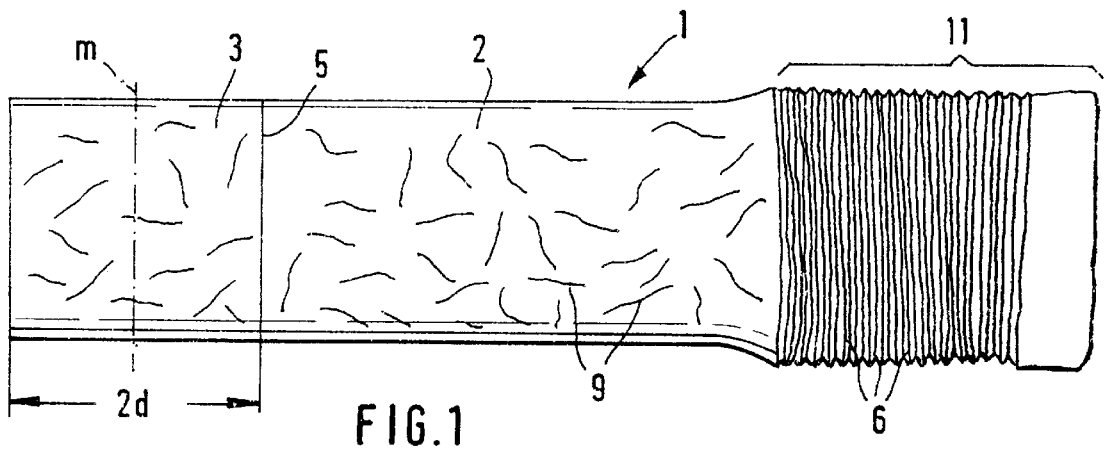
FIG. 1 shows a diagrammatic side view of one end and of a partially extended part of a folded casing.

The present invention is explained in more detail below by reference to the drawings which are illustrative of preferred embodiments. FIG. 1 shows a diagrammatic side view of a part of a folded casing 1. In the right-hand part of the drawing, the folded casing 1 is compressed to form a concertina or stick configuration 11, of which an extended part 2 extends toward the left and merges into a front end 3. The stick configuration 11 preferably comprises cup-shaped folds 6 pushed into one another. The end 3 preferably includes two section lengths d and is divided into two halves by an axis m transversely to the longitudinal direction of the folded casing 1. The part 2 and the end 3 may include kinks 9 which result from the fact that the end 3 and the part 2 of the folded casing 1 may be initially pushed into the stick configuration 11 and are pulled out of the latter for the pleating and tying-up of the front end 3 of the folded casing 1. However, the part 2 and the end 3 can also be smooth, i.e., free of kinks. The front end 3 of the folded casing 1 is preferably folded over transversely to the longitudinal direction of the folded casing 1 along the axis m, so that the two equal-sized section lengths d and d come to be superposed. The section length d should preferably be at least 2 cm. The two superposed section lengths d, d and the part 2 are then expediently pleated, i.e., folded in the longitudinal direction of the folded casing 1, as shown diagrammatically in FIG. 2. The folded-over end 3 is preferably tied up along an edge 5. Tying is effected, for example, by employing a tying means 4 in the form of a string, cord, or any other suitable device which serves a similar purpose, which preferably bears against the edge 5 of the folded-over pleated end 3.

Figure 2:
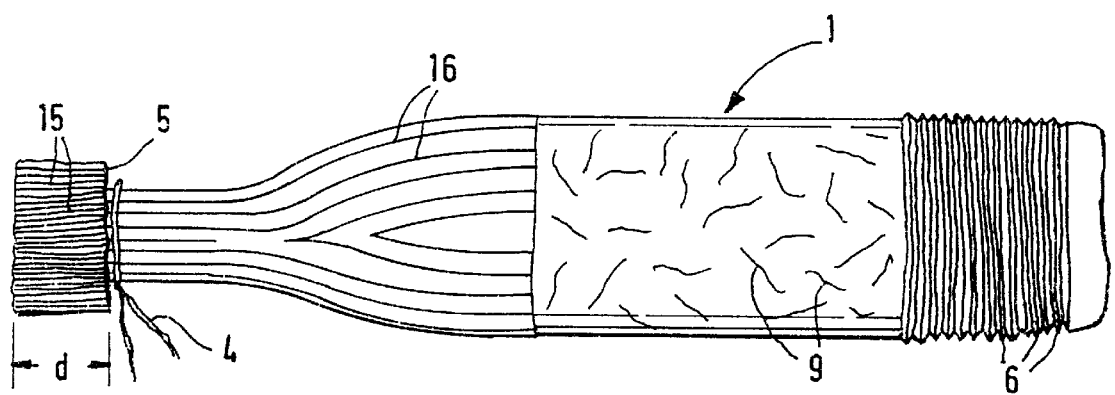
FIG. 2 shows the folded-over end of the folded casing according to FIG. 1 in a pleated and tied-up state.

The tying means 4, as shown in FIG. 2, may optionally include loops, depending on whether the filled folded casing 1 is envisaged to be hung up or whether the filled casing will be transported and/or stored horizontally. The tying means 4 is located in front of the folded-over and pleated end 3 and may serve as an auto-closure during the filling of the folded casing 1. This is because the tying means 4 preferably bears against the edge 5 on the folded-over end 3. The tying means 4 may also be pressed against the folded-over end 3 by the filling pressure exerted in the interior of the folded casing 1, but the tying means should be adapted to not be pushed any further than the folded over end 3 during filling. The tying means 4 generally is adapted to permit a filling pressure of, for example, 0.6 to 0.8 bar during the filling of the folded casing 1, without the latter bursting or the front end 3 opening. It is clear from FIG. 2 that it is possible for the pleating with pleats 16 to extend beyond the end 3 to the part 2, the pleats 16 (like the pleats 15 of the folded-over end 3) being substantially perpendicular to the plane of the drawing. The end 3 may be folded over and tied on a combined shirring and tying machine. It is also possible for the pleats 15 and 16 to be made by a combined shirring and tying machine.

Figure 3:
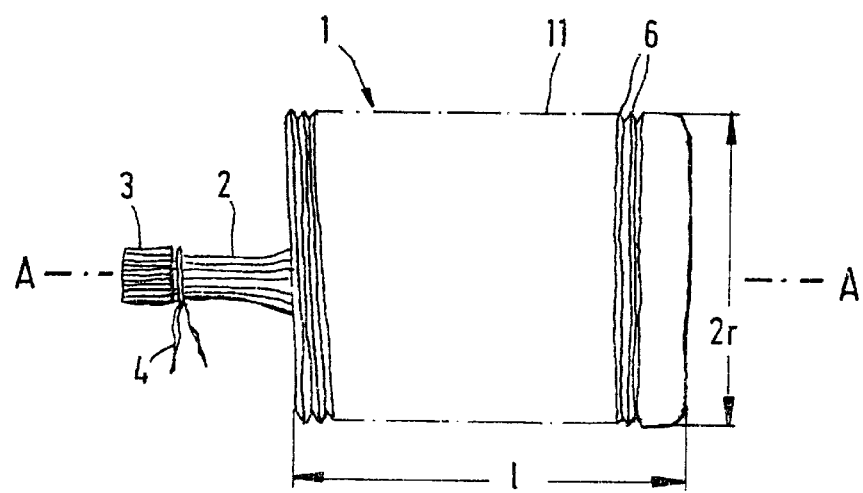
FIG. 3 shows a side view with a pleated end slipped over stick configuration form in the folded casing.

FIG. 3 shows a casing 1 with a compressed part 2 pushed in. The part 2, extended in FIG. 1, may be pushed so far into the interior of the stick configuration 11 that only the tied-up end 3 and a small section of the part 2 are located outside the stick configuration 11. The outer diameter A of the stick configuration 11 may be, for example, 80 to 95 mm, while the length 1 of the stick configuration 11 may be, for example, about 80 to 90 mm. The internal diameter of the stick configuration 11 is preferably 65 to 75 mm. At an internal diameter of, for example, 70 mm of the stick configuration 11, the shirring of the folded casing 1 and the stick configuration 11 may be accomplished using a shirring mandrel having a diameter of about 73 mm. For filling such a folded casing 1, a stuffing horn having an internal diameter of, for example, 60 mm can be used. The folded density, given by the ratio of the length of the unfolded casing 1 to the length of the stick configuration 11, may generally fall in a range from 30:1 to 40:1.

Figure 4:
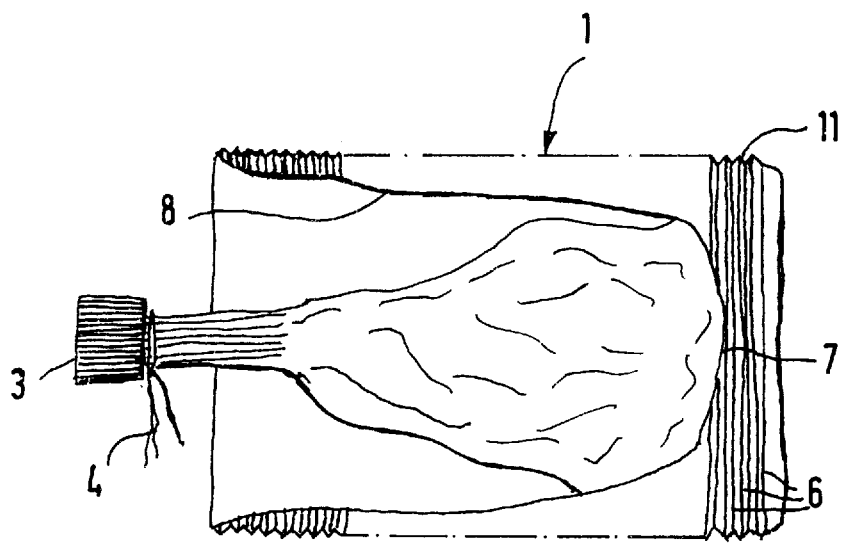
FIG. 4 shows a section along the line A—A in FIG. 3.

FIG. 4 shows a section along the line A—A in FIG. 3. The folds 6 of the stick configuration 11 are formed in the shape of cups or shells, which is the preferable shape for the folds, each individual fold having a height of approximately up to 20 mm. The folds are preferably fitted into one another to give the stick configuration 11. The folds 6 extending around the circumference of the stick configuration 11 should be bent substantially inwardly, i.e., they should have an inward concave curvature over the height of the circumference. The part 2 adjoining the front end 3 of the casing 1 is preferably turned into the interior of the stick configuration 11 and has the shape of a cup 8 with a curved bottom 7, the cup extending into the interior of the stick configuration 11, so that only the tied-up end 3 and the tying means 4 protrude from the stick configuration 11. For shipping the stick configuration 11, the end 3 may also be pressed into the interior of the stick configuration 11, in order to save space. In FIGS. 3 and 4, the folded casing 1 is folded together to form a stick configuration 11 and is essentially ready for processing by soaking and subsequent filling of the folded casing on a filling machine. The high folded density of the stick configuration 11 and the height of up to 20 mm of the individual fold 6 of the stick configuration ensure a high stability of the form and shape of the stick configuration 11, which are substantially preserved even after prolonged presoaking in spite of the extension of the casing material.

Figure 5:
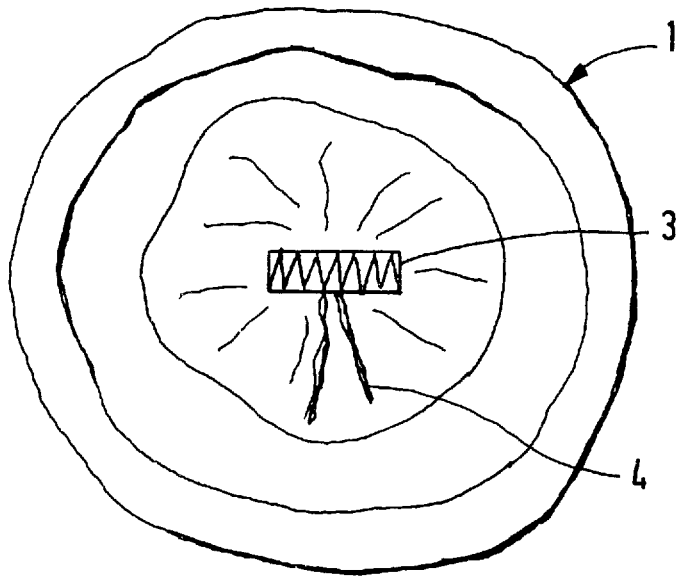
FIG. 5 shows a plan view of a folded casing in the direction of the front end.

FIG. 5 depicts a plan view of a folded casing 1 in the direction of the tied-up end 3 and illustrates the pleating and the tying means 4 of the end 3.

Figure 6:
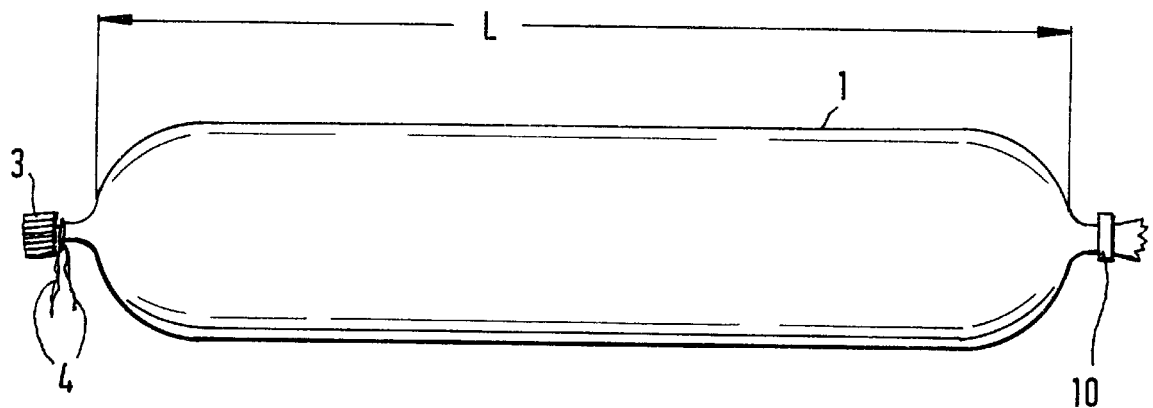
FIG. 6 shows an extended and filled folded casing.

FIG. 6 diagrammatically shows a casing 1 of a length L, fully filled with a product, for example, a sausage meat. The front end 3, folded over and pleated, is preferably sealed by a string or a cord which serves as the tying means 4. The rear end is preferably sealed by a clip 10 of for example, metal or plastic, which is fitted in a known manner after the end of a filling step on a filling machine. The length of the unfolded casing 1 or of the filled casing 1, as shown in FIG. 6, may generally be in a range from 1.5 to 3.5 m, and especially is equal to or greater than 1.8 m. As already mentioned above, the casing 1 may be filled, for example, with sausage meat which is then smoked and dried in the tied-up state. As soon as the sausage meat has dried, the casing 1 may be peeled off and subsequently recycled and/or composted. If the casing 1 is composted, it is advantageous if a net is not required. Since, according to the prior art, nets are generally required for casings having a length of more than 1.8 m, the invention offers the advantage that recycling or working-up of the net is avoided. The moisture content before soaking the casing 1 or the stick configuration 11 should preferably be less than 18%, since otherwise a fungicide may be required. The use of a fungicide is generally not permissible for composting, since a fungicide would destroy bacteria.

Figure 7:
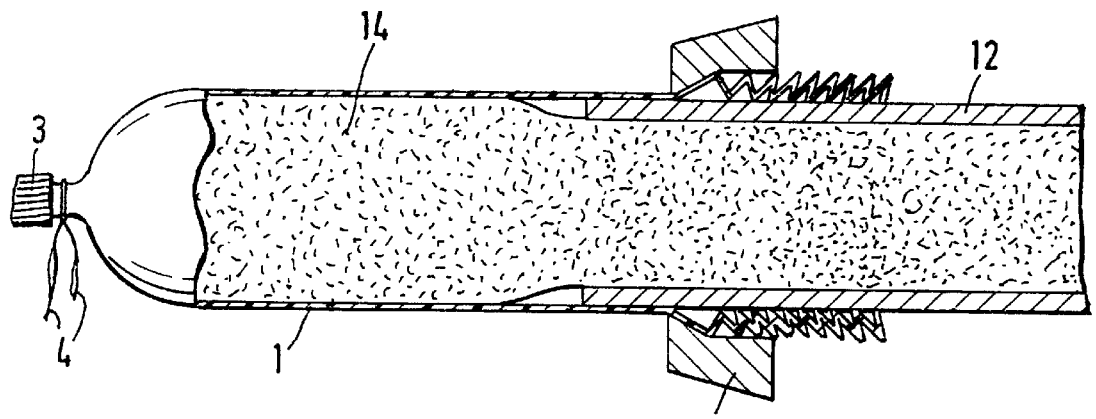
FIG. 7 shows a diagrammatic section through s folded casing slipped over a stuffing horn, while the casing is being filled.

FIG. 7 diagrammatically shows, in section, a casing 1 slipped over a stuffing horn 12 during a filling operation with sausage meat 14. The casing 1 is seated on the stuffing horn 12, and a filling ring 13 presses the casing 1 against the stuffing horn 12. The outer diameter of the stuffing horn 12 should be approximately the same size as the internal diameter of the casing 1. The filling pressure, at which the sausage meat 14 or another product is filled into the casing 1, should preferably be between 0.6 and 0.8 bar, and the filling speed should be preferably 21 to 32 cm per second. Before the stick configuration 11 is manually slipped over the stuffing horn 12, soaking takes place for preferably at least 30 to 40 minutes in water which is, for example, at a temperature of up to 50° C. During this soaking, the form and shape of the stick configuration are substantially preserved and the longitudinal extent should be less than or equal to 1.5% of the length of the unfolded casing 1 in the state before the soaking. The curved bottom 7 of the cup 8 of the vertically standing stick configuration 11 generally can take up water and hold the moisture for a prolonged period. The purpose of the presoaking is to enhance the suppleness of the casing material and thus, to facilitate handling. It is advantageous that the small length of the stick configuration 11 generally minimizes soiling of the casing, even during periods of prolonged storage. Usually, the front end 3 of the casing 1 is folded over and then pleated, but it is also possible for the end 3 to be pleated first and then to be folded over and tied up.

A casing 1 as shown in FIG. 6 can, for example, have a diameter of 85 to 90 mm at the start of the filling step and it can be extended by the presoaking to such an extent that the diameter can be, for example, between 105 to 110 mm after the filling step has been completed.

Additional advantages, features and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A folded casing arrangement capable of being used for individually filled products, said casing arrangement comprising:
   a casing having an extended length, said casing being arranged to have at least three portions, including:
      a first end portion formed at one end of said casing which forms a stick configuration, said first end portion having a plurality of folds compressed into one another;
      middle portion; and
      a second end portion including a folded portion that is folded transversely to the length of the casing, said folded portion further being pleated in a longitudinal direction with respect to the casing, whereby pleats formed about the length of the casing are substantially perpendicular to the plane of the folded section, said second end portion further being provided with a tying means, which bears against an edge of the folded portion of said second end portion.

2. A folded casing arrangement as claimed in claim 1, wherein two equal-sized pleated section lengths (d, d) of the second end portion are superposed to comprise said folded portion.

3. A folded casing arrangement as claimed in claim 3, wherein the section length (d) is at least 2 cm.

4. A folded casing arrangement as claimed in claim 1, wherein the plurality of folds of said first end portion are shaped in the form of a cup or shell, each fold of said plurality of folds being bent substantially inwardly and having a height of up to 20 mm, and wherein the folds of said plurality of folds are fitted into each other to form a stick configuration.

5. A folded casing arrangement as claimed in claim 1, wherein said middle portion of said casing is formed into the shape of a cup with a curved bottom which extends into the interior of the stick configuration formed in said first end portion of the casing.

6. A folded casing arrangement as claimed in claim 1, wherein the length of said casing is in the range from 1.5 m to 3.5 m.

7. A folded casing arrangement as claimed in claim 1, wherein the casing is filled with sausage meat and said casing is capable of being peeled away from said meat and recycled after smoking and drying.

8. A folded casing arrangement as claimed in claim 1, wherein the internal diameter of the stick configuration of said first end portion is from 65 to 75 mm and the outer diameter of said stick configuration is from 80 to 95 mm.

9. A folded casing arrangement as claimed in claim 1, wherein the folded density, as expressed by the ratio of the overall extended length of the casing to the length of the stick configuration, is in the range from 30:1 to 40:1.

10. A folded casing arrangement as claimed in claim 1, wherein, when said casing arrangement is soaked for a period of at least 30 to 40 minutes, said arrangement is substantially preserved and a longitudinal extent of said casing arrangement after being soaked is less than or equal to 1.5% of a longitudinal extent of the casing arrangement prior to being soaked.

11. A folded casing arrangement as claimed in claim 9, wherein said arrangement is capable of being used with a stuffing horn having an outer diameter that is at least approximately equal to the internal diameter of the casing.

12. A folded casing arrangement as claimed in claim 1, wherein said arrangement is capable of being used in filling operations having filling pressures of a product to be filled in a range from 0.6 to 0.8 bar and filling speeds from 21 to 32 cm/second.

13. A folded casing arrangement as claimed in claim 1, wherein the overall length of said casing is equal to or greater than 1.8 m.

14. A folded casing arrangement as claimed in claim 1, wherein pleating extends beyond said folded portion of said second end portion and into said middle portion of said casing.

15. A folded casing arrangement according to claim 1, wherein said middle portion of said casing is inserted into said stick configuration so that said tied folded end protrudes outside said stick portion.

16. A folded casing arrangement according to claim 1, wherein said middle portion of said casing is inserted into said stick configuration so that said tied folded end is in the interior of said stick portion.

17. A method for producing a folded casing comprising:

compressing a first end of said casing by imposing a series of folds therein so that said first end of said casing forms a stick configuration;

folding a length d of the opposite end of said casing transversely to the longitudinal direction of the folded casing along an axis m so that two section lengths of said casing having a length d are superposed and form a folded end;

pleating said folded end by folding said folded end in the longitudinal direction of said folded casing whereby the pleats formed about the length of the casing are substantially perpendicular to the plane of the folded section; and tying said folded end whereby the tying means bears against the edge of the folded portion of said opposite end.

18. A method according to claim 17, wherein said pleating extends beyond said folded end and into a middle portion of said casing, and said method further, comprises:

inserting said middle portion of said casing into said stick configuration so that said tied folded end protrudes outside said stick portion.

19. A method according to claim 17, wherein said pleating and typing are accomplished by a combined shirring and tying machine.

20. A method according to claim 17, wherein said folds of said stick configuration are in the shape of cups or shells.

21. A method according to claim 17, wherein said pleating extends beyond said folded end and into a middle portion of said casing, and said method further comprises:

inserting said middle portion of said casing into said stick configuration so that said tied folded end is in the interior of said stick portion.

22. A method according to claim 17, wherein said pleating step precedes said folding step.

23. A method according to claim 17, wherein said folding step precedes said pleating step.

* * * * *